United States Patent [19]

Iwabuchi et al.

[11] Patent Number: 4,982,286
[45] Date of Patent: Jan. 1, 1991

[54] VIDEO SIGNAL PROCESSING DEVICE PERFORMING FREEZING AND FRAME SYNCHRONIZATION FUNCTIONS

[75] Inventors: Yoshitsugu Iwabuchi; Shinichi Yamashita, both of Yokohama, Japan

[73] Assignee: Canon Kabushiki Kaisha, Tokyo, Japan

[21] Appl. No.: 429,558

[22] Filed: Oct. 31, 1989

[30] Foreign Application Priority Data

Oct. 31, 1988 [JP] Japan ................................. 63-275255

[51] Int. Cl.⁵ .............................................. H04N 5/14
[52] U.S. Cl. ..................................... 358/160; 358/149
[58] Field of Search ................ 358/149, 160, 148, 13, 358/17, 19; 360/36.1, 36.2, 10.1

[56] References Cited

U.S. PATENT DOCUMENTS 4,558,377 12/1985 Collins et al. ...................... 360/36.2
4,858,010 8/1989 Field ................................... 358/160
4,862,269 8/1989 Sonada et al. ...................... 358/160

*Primary Examiner*—James J. Groody
*Assistant Examiner*—David E. Harvey
*Attorney, Agent, or Firm*—Fitzpatrick, Cella, Harper & Scinto

[57] ABSTRACT

A video signal processing device includes first access circuitry for writing a video signal in a memory capable of storing a video signal of at least two picture frames, and second access circuitry for reading the video signal from the memory. Comparision circuitry then compares a first address accessed by the first access circuitry with a second address accessed by the second access circuitry. The second address is then shifted by the amount of an integer of picture frames in accordance with the result of the comparison either at the moment when the first access circuitry is granted access to the memory or when access of the first access circuitry to the memory is stopped.

17 Claims, 2 Drawing Sheets

VIDEO SIGNAL PROCESSING DEVICE PERFORMING FREEZING AND FRAME SYNCHRONIZATION FUNCTIONS

BACKGROUND OF THE INVENTION

1. Field of the Invention

This invention relates to a video signal processing device, and more particularly, to a video signal processing device using a random access memory (RAM).

2. Description of the Prior Art

Heretofore, in a circuit for providing a freezing function of a digital image signal and a so-called frame synchronizing function using a random access memory (RAM), the two functions have been provided in separate memory circuits, respectively, because address control, memory capacity and the like differ between a RAM for performing the freezing function and a RAM for performing the frame synchronizing function.

That is, in a circuit for providing the freezing function, there is provided a RAM having a memory capacity for the amount of at least one frame (field). In a case other than a frozen state, image data which have previously been digitized are sequentially written using one address at every one cycle time of the RAM. When image data are passed through the RAM, that is, when freezing is not performed, image data are similarly sequentially read while performing data writing. When freezing is performed, the writing of image data is stopped, and image data for the amount of one frame (which have been input immediately before the stoppage) are sequentially and repeatedly read.

In a circuit for providing the frame synchronizing function, there is provided a RAM having a memory capacity for the amount of at least one frame. In order to prevent the write and read timings of image data for the RAM from gradually deviating due to differences in the clock systems, and to prevent the write and read addresses overlapping each other, a method is adopted in which a deviation between the write and read timings is detected according to a difference between the write and read addresses. Then, the write or read address is skipped when the deviation becomes equal to or larger than a certain threshold value. From the viewpoint of the skipping of the address and the deviation of write and read timings, the RAM for providing the frame synchronizing function usually has a memory capacity of two frames.

As described above, the RAM for providing the freezing function has a memory capacity of at least one frame, the RAM for providing the frame synchronizing function has a memory capacity of two frames, and a dedicated memory control circuit is coupled to each RAM. Hence, the configuration of the control circuit is complicated. Furthermore, a memory capacity as large as three frames is required.

SUMMARY OF THE INVENTION

It is an object of the present invention to provide a video signal processing device which can provide freezing and frame synchronizing functions with smaller memory capacity.

It is another object of the present invention to provide freezing and frame synchronizing functions in a video signal processing device having a simple circuit configuration.

These and other objects are accomplished, according to one aspect of the present invention, by a video signal processing device comprising (a) a memory capable of storing a video signal for two picture surfaces, (b) first access means for writing the video signal in the memory, (c) second access means for reading the video signal from the memory, (d) stop means for stopping access to the memory by the first access means, (e) comparison means for comparing a first address with which the first access means accesses the memory with a second address with which the second access means accesses the memory, and (f) address shift means for shifting the second address by n picture frames according to the result of the comparison by the comparison means, where n is an integer.

According to a further aspect of the invention, a video signal processing device includes a memory capable of storing a video signal for two picture frames, first access means for writing the video signal into the memory, and second access means for writing the video signal from a memory. Circuitry is provided for stopping a change in a first address with which the first access means accesses the memory. Comparison means are provided for comparing the first address with a second address with which the second access means accesses the memory. Finally, address shift means are provided for shifting the second address by n picture frames according to a result of the comparison output by the comparison means, where n is an integer.

According to yet a further aspect of the present invention, a video signal processing device includes a memory capable of storing a video signal for two picture frames. First access means are provided for writing a video signal into memory, and second access means are provided for reading the video signal from memory. Comparison means compare a first address with which the first access means accesses the memory with a second address with which the second access means accesses the memory. Address shift means are provided for shifting the second address by n picture frames according to the result of comparison by said comparison means, where n is an integer. The device has a first mode in which the first access means stops access to the memory, and a second mode in which said first access means accesses the memory.

According to another aspect of the present invention, the video signal processing device includes a memory capable of storing a video signal for two picture frames. First access means are provided for writing a video signal into memory, and second access means are provided for reading the video signal from memory. Comparison means compare a first address with which said first access means accesses said memory with a second address with which said second access means accesses said memory. Address shift means are provided for shifting the second address by n picture frames according to a result of the comparison by the comparison means, where n is an integer. The device has a first mode in which the first access means stops a changing of the first address, and a second mode in which the first access means changes the first address.

These and other objects and features of the present invention will become more apparent from the following detailed description of the preferred embodiment with reference to the accompanying drawings.

DETAILED DESCRIPTION OF THE PREFERRED EMBODIMENT

The preferred embodiment of the present invention will now be explained with reference to the drawings.

Figure 1:
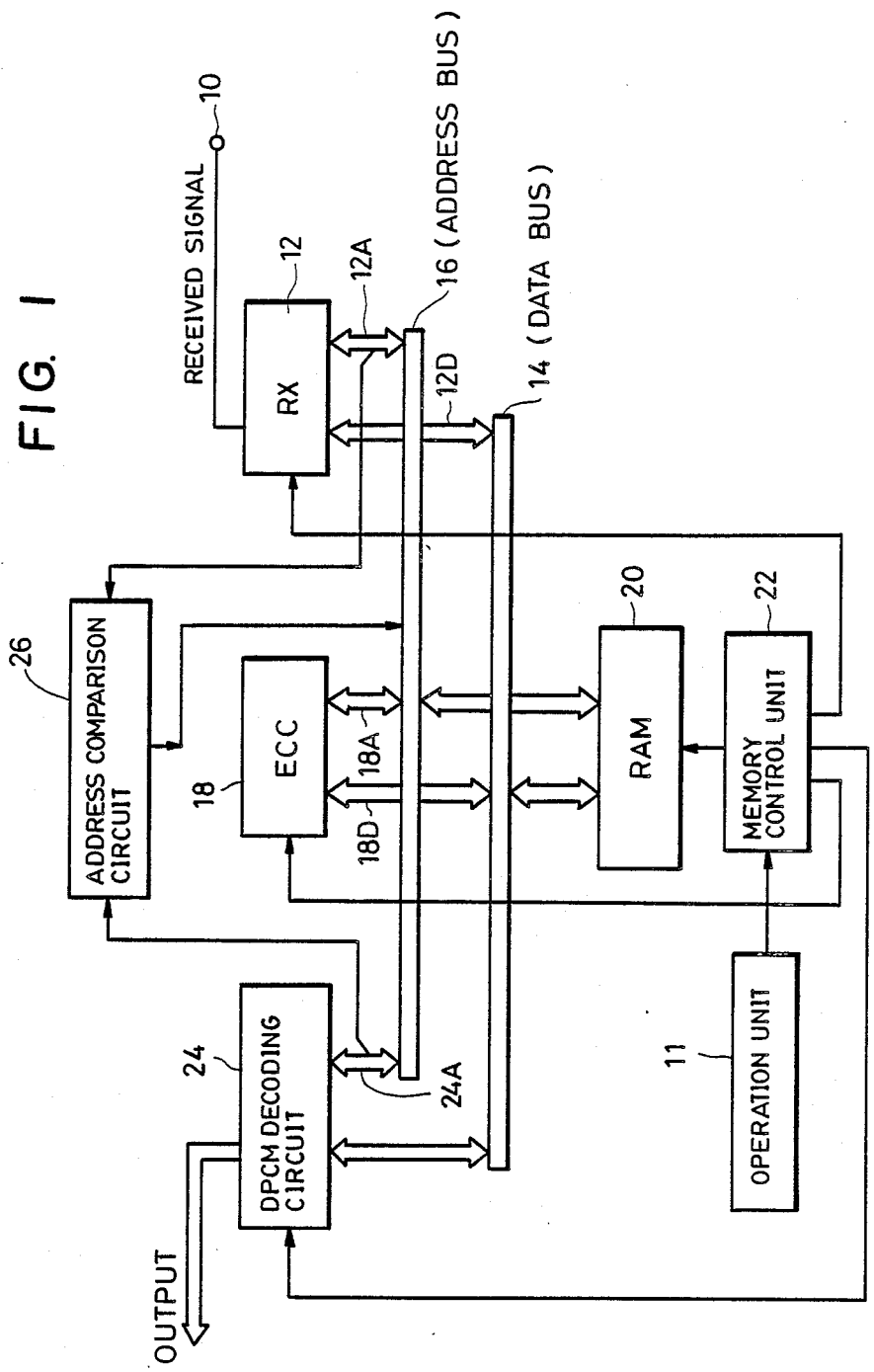
FIG. 1 is a block diagram showing the schematic configuration of a processing device as an embodiment of the present invention.

FIG. 1 is a block diagram of an embodiment of the present invention for use in a decoder which receives and decodes signals including codes made by compressing image signals by predictive differential coding (DPCM), check bits of error correcting codes, and the like. In FIG. 1, there are shown an input terminal 10 for received signals, a manual operation unit 11, a reception processing circuit 12, a data bus 14, an address bus 16, an error correction processing circuit (ECC) 18, a random access memory (RAM) 20 having a memory capacity of two frames, a memory control circuit 22, a DPCM decoding circuit 24, and an address comparison circuit 26.

The reception processing circuit 12 performs (1) detection of synchronizing signals from among received signals at the input terminal 10 and (8-bit) serial-parallel conversion, (2) outputs received data 12D including video information codes, check bits of error correcting codes, and the like to the data bus 14, and (3) outputs received address data 12A (a first address) to the address bus 16. At this time, only when the memory control circuit 22 permits the reception processing circuit 12 to write into the memory 20 in accordance with an operation of the operation unit 11 as described below, the received address data 12A are supplied to the memory 20 via the address bus 16, and the received data 12D are written in the memory 20 at an address which corresponds to the received address data.

The error correction processing circuit 18 then performs a calculation of a syndrome relative to an error correcting code of the received data written in the memory 20, detects and corrects errors in the reveived dat using the syndrome, and outputs a (1) video information code 18D after error correction (ECC data) and (2) ECC address data 18A corresponding to the address in which the ECC data are to be written. At this time, only when the memory control circuit 22 permits the error correction processing circuit 18 to write in the memory 20 in accordance with an operation of the operation unit 11, the ECC address data 18A are supplied to the memory 20 via the address bus 16, and the ECC data 18D are written in the memory 20 at an address which corresponds to the ECC address. The received data having errors are thereby corrected.

On the other hand, the memory control circuit 22 gives the DPCM decoding circuit 24 an instruction to read an address (a second address) other than the address (the first address) in which the received data are written and the address in which the ECC data are written. The DPCM decoding circuit 24 outputs the assigned DPCM address 24A to the address bus 16, sequentially reads data from the memory 20, performs DPCM decoding of the read data, and outputs the decoded data. DPCM decoding includes expanding the data-compressed video signal stored in RAM 20.

Furthermore, by sequentially shifting addresses in which the received data and ECC data are written in the memory 20 with a 2-frame period, it is possible to correct and read all data for the two frames.

Figure 2:
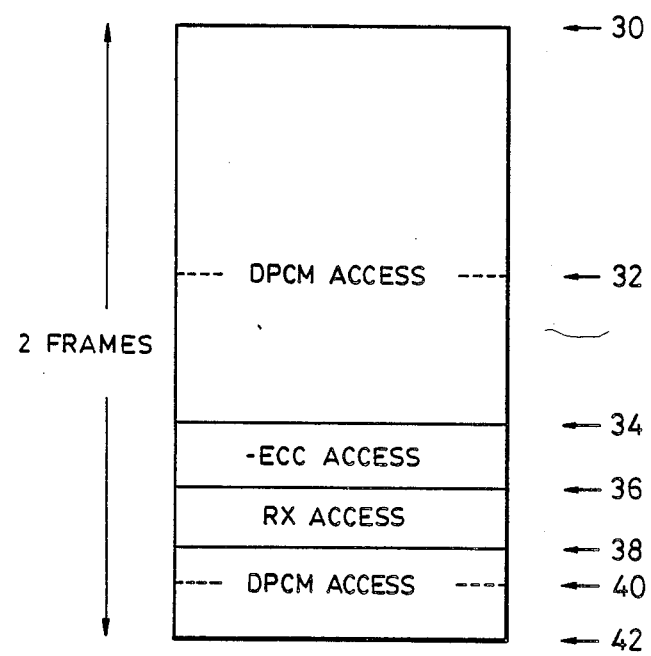
FIG. 2 is a diagram for explaining access addresses for the memory in FIG. 1.

FIG. 2 is a schematic diagram of the address layout in the memory 20. In FIG. 2, there are shown a first address 30 and a last address 42. The reception processing circuit 12 writes received data while accessing addresses 36 - 38. The error correction processing circuit 18 rewrites received data (which have been written immediately before) into ECC data while accessing addresses 34 - 36. The DPCM decoding circuit 24 sequentially reads data while accessing addresses 38 - 42 - 30 - 34. At this time, since addresses 34 - 36 accessed by the error correction processing circuit 18 and addresses 36 - 38 accessed by the reception processing circuit 12 shift to more significant addresses for every two frames, the newest received data and the oldest received data are written in addresses 34 and 38, respectively.

Next, address access in a frozen state will be explained. In FIG. 1, when a frozen state is provided in accordance with an operation of the operation unit 11, the memory control circuit 22 stops the access of the reception processing circuit 12 and the error correction processing circuit 18 to the memory 20. That is, generation of the received address 12A and writing of received data in the memory 20 are stopped. At this time, the DPCM decoding circuit 24 generates the DPCM address 24A as usual, and supplies it to the address bus 16. The address comparison circuit 26 compares the stopped received address 12A of the reception processing circuit 12 with the changing DPCM address 24A of the DPCM decoding circuit 24, and inverts the msb (most significant bit) in the DPCM address on the address bus 16 when the difference between the above-described two addresses becomes smaller than a predetermined threshold value.

A case in which the msb in the DPCM address on the address bus 16 is inverted in a frozen state will be explained with reference to FIG. 2. In FIG. 2, suppose that the access addresses for the reception processing circuit 12 and the error correction processing circuit 18 are stopped at 36 - 38 and 34 - 36, respectively. At this time, numeral 32 indicates the access position of the DPCM address immediately before inverting the msb on the address bus 16, and numeral 40 indicates the access position of the DPCM address immediately after inverting the msb in the address 32. At the moment when the msb in the DPCM address on the address bus 16 has been inverted, the DPCM address jumps from address 32 to address 40, and subsequently repeats access in the sequence of addresses 42→30→32→40. That is, at the moment when the msb in the address bus 16 has been inverted, the address shifts by the amount of one frame, and the freezing function is provided by repeatedly outputting data subjected to error correction in the memory 20 by the amount of one frame.

Next, address access in accordance with the frame synchronizing function will be explained. In FIG. 1, the operation of the reception processing circuit 12 is regulated by clock signals from the coder side, and the operation of the DPCM decoding circuit 24 is regulated by clock signals from the decoder side. The two clock signals belong to systems which are different from each other. Accordingly, even when the memory map shown in FIG. 2 is set, there is a possibility that a deviation in timing is produced due to a minute difference in speed between the two clock signals, the received address accessed by the reception processing circuit 12 and the DPCM address accessed by the DPCM decoding circuit 24 overlap with each other, and writing of the received data and reading of the DPCM data coexist. In this case, data before error correction are output. In the present embodiment, in order to prevent this possibility, a proper threshold value is set for the address comparison circuit 26, and the msb in the DPCM address on the address bus 16 is inverted when the difference between the received address 12A and the DPCM address 24A becomes smaller than the threshold value. In FIG. 2, at the moment when the msb in the DPCM address on the address bus 16 has been inverted, the address accessed by the DPCM decoding circuit 24 jumps from address 32 to address 40, and subsequently repeats a normal address access like addresses 42→30→32→34→36→38→40.

As described above, overlapping of the access by the reception processing circuit 12 and the access by the DPCM decoding circuit is prevented, and the frame synchronizing function is provided.

Although, in the above explanation, a DPCM decoder has been illustrated, the present invention can, of course, be applied to all other systems dealing with digital image signals. Furthermore, although, in the present embodiment, the capacity of the memory 20 is two frames, and the msb in the DPCM address is inverted, the shift amount of the address may also be made for the amount of n (n is an integer greater than or equal to 1) frames, when a memory having a further larger capacity is used as the memory 20.

As can be easily understood from the above explanation, according to the present invention, it is possible to provide freezing and frame synchronizing functions with a small circuit configuration.

The individual components shown in outline or designated by blocks in the drawings are all well known in the video signal processing art, and their specific construction and operation is not critical to the operation or best mode for carrying out the invention.

While the present invention has been described with respect to what is presently considered to be the preferred embodiment, it is to be understood that the invention is not limited to the disclosed embodiment. To the contrary, the present invention is intended to cover various arrangements included within the spirit and scope of the appended claims. The scope of the following claims is to be accorded the broadest interpretation so as to encompass all such modifications and equivalent structures.

What is claimed is:
1. A video signal processing device comprising:
(a) a memory capable of storing a video signal for two picture frames;
(b) first access means for writing a video signal in said memory;
(c) second access means for reading a video signal from said memory;
(d) stop means for stopping said first access means from accessing said memory;
(e) comparison means for comparing a first address with which said first access means accesses said memory with a second address with which said second access means accesses said memory; and
(f) address shift means for shifting said second address by n picture frames according to a result of the comparison output by said comparison means, where n is an integer.

2. A device according to claim 1, wherein said stop means further includes manually-operable operation means for inputting a command to stop the access of said first access means to said memory.

3. A device according to claim 1, further comprising:
third access means for reading a video signal from said memory and writing a video signal in said memory.

4. A device according to claim 3, wherein said third access means includes an error correction circuit for reading data stored in said memory and correcting code errors in the read data.

5. A device according to claim 3, wherein said comparison means includes determination means for determining whether or not a difference between said first address and said second address is within a predetermined threshold value.

6. A device according to claim 5, wherein said threshold value is set at a value larger than a difference between an address read by and an address written by said third access means.

7. A device according to claim 1, wherein said first access means includes a reception circuit for receiving a data-compressed video signal and writing the received video signal in said memory.

8. A device according to claim 7, wherein said second access means includes means for expanding data in said data-compressed video signal stored in said memory.

9. A device according to claim 1, wherein the capacity of said memory corresponds to a video signal for the amount of two picture frames and wherein said address shift means shifts said second address by an amount of one picture frame.

10. A device according to claim 9, wherein said second address comprises plural-bit binary data, and wherein said address shift means inverts a most significant bit in said second address.

11. A device according to claim 1, wherein said device includes a first mode in which said stop means stops access to said memory by said said first access means, and a second mode in which said first access means accesses said memory, and wherein said address shift means is operable in said first mode as well as in said second mode.

12. A video signal processing device comprising:
(a) a memory capable of storing a video signal for two picture frames;
(b) first access means for writing a video signal in said memory;
(c) second access means for reading a video signal from said memory;
(d) stop means for stopping a change in a first address with which said first access means accesses said memory;
(e) comparison means for comparing said first address with a second address with which said second access means accesses said memory; and
(f) address shift means for shifting said second address by n picture frames according to a result of the comparison output by said comparison means, where n is an integer.

13. A device according to claim 12, wherein said device includes a first mode in which said stop means stops changing said first address by said first access means, and a second mode in which said first access means changes said first address, and wherein said address shift means is operable in said first mode as well as in said second mode.

14. A video signal processing device comprising:
(a) a memory capable of storing a video signal for two picture frames;
(b) first access means for writing a video signal in said memory;
(c) second access means for reading a video signal from said memory;
(d) comparison means for comparing a first address with which said first access means accesses said memory with a second address with which said second access means accesses said memory; and
(e) address shift means for shifting said second address by n picture frames according to a result of the comparison output by said comparison means, where n is an integer, and wherein
said device includes a first mode in which said first access means stops accessing said memory, and a second mode in which said first access means accesses said memory.

15. A device according to claim 14, wherein said address shift means is operable in said first mode as well as in said second mode.

16. A video signal processing device comprising:
(a) a memory capable of storing a video signal for two picture frames;
(b) first access means for writing a video signal in said memory;
(c) second access means for reading a video signal from said memory;
(d) comparison means for comparing a first address with which said first access means accesses said memory with a second address with which said second access means accesses said memory; and
(e) address shift means for shifting said second address by n picture frames according to a result of the comparison output by said comparison means, where n is an integer, and wherein
said device includes a first mode in which said first access means stops a changing of said first address, and a second mode in which said first access means changes said first address.

17. A device according to claim 16, wherein said address shift means is operable in said first mode as well as in said second mode.

* * * * *

UNITED STATES PATENT AND TRADEMARK OFFICE
CERTIFICATE OF CORRECTION

PATENT NO. : 4,982,286

DATED : January 1, 1991

INVENTOR(S) : Yoshitsugu IWABUCHI, ET AL

It is certified that error appears in the above-identified patent and that said Letters Patent is hereby corrected as shown below:

AT 57 ABSTRACT:

Line 5, "Comparision" should read --Comparison--.

COLUMN 6:

Line 40, "said said" should read --said--.

Signed and Sealed this

Twenty-first Day of July, 1992

*Attest:*

DOUGLAS B. COMER

*Attesting Officer*      *Acting Commissioner of Patents and Trademarks*